April 14, 1959 G. H. GARRAWAY 2,881,796
RECIRCULATING AND SUPPLY VALVE
Filed Feb. 17, 1954 2 Sheets-Sheet 1
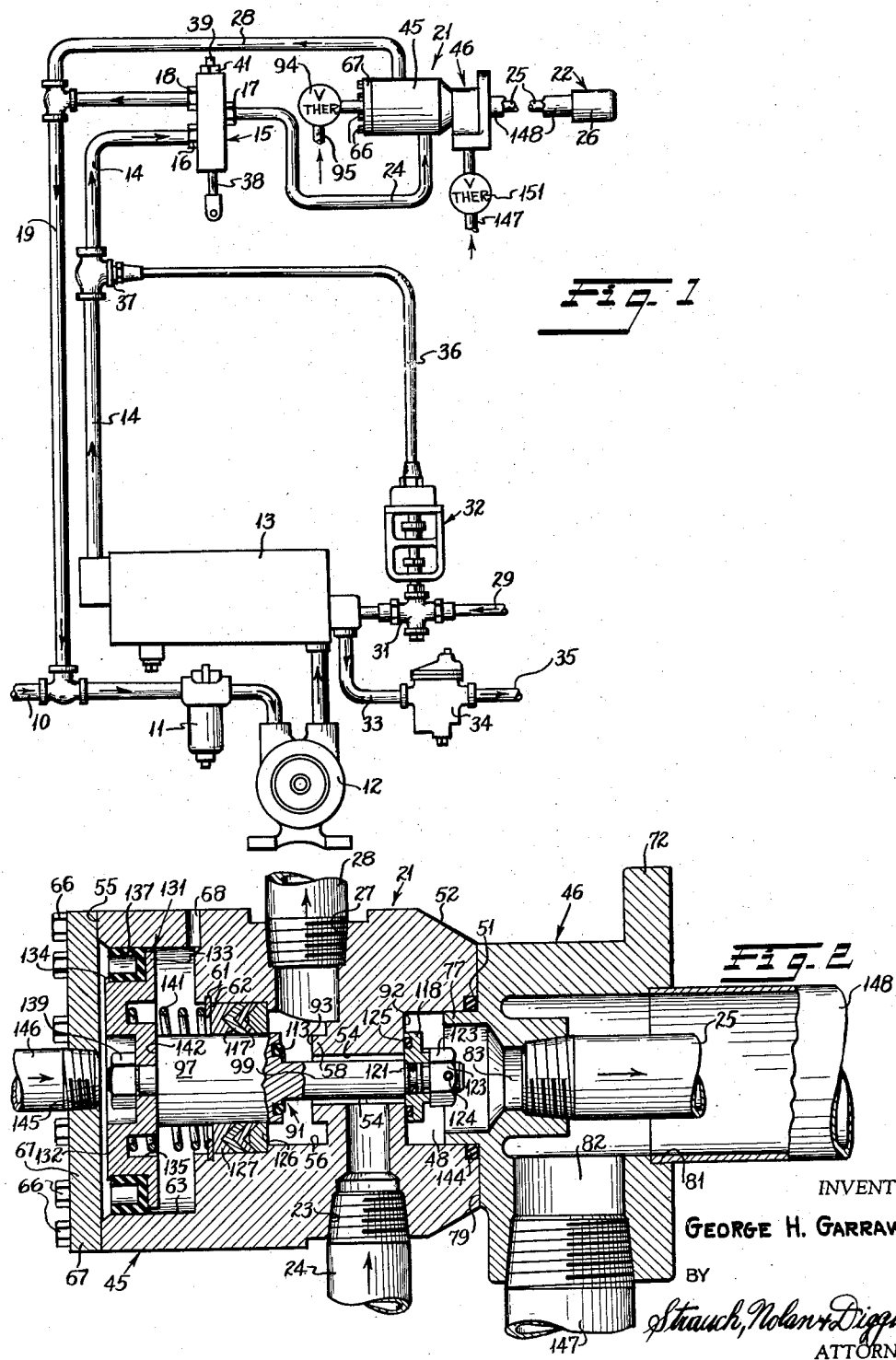
INVENTOR
GEORGE H. GARRAWAY
BY
Strauch, Nolan + Diggins
ATTORNEYS April 14, 1959 G. H. GARRAWAY 2,881,796
RECIRCULATING AND SUPPLY VALVE
Filed Feb. 17, 1954 2 Sheets-Sheet 2
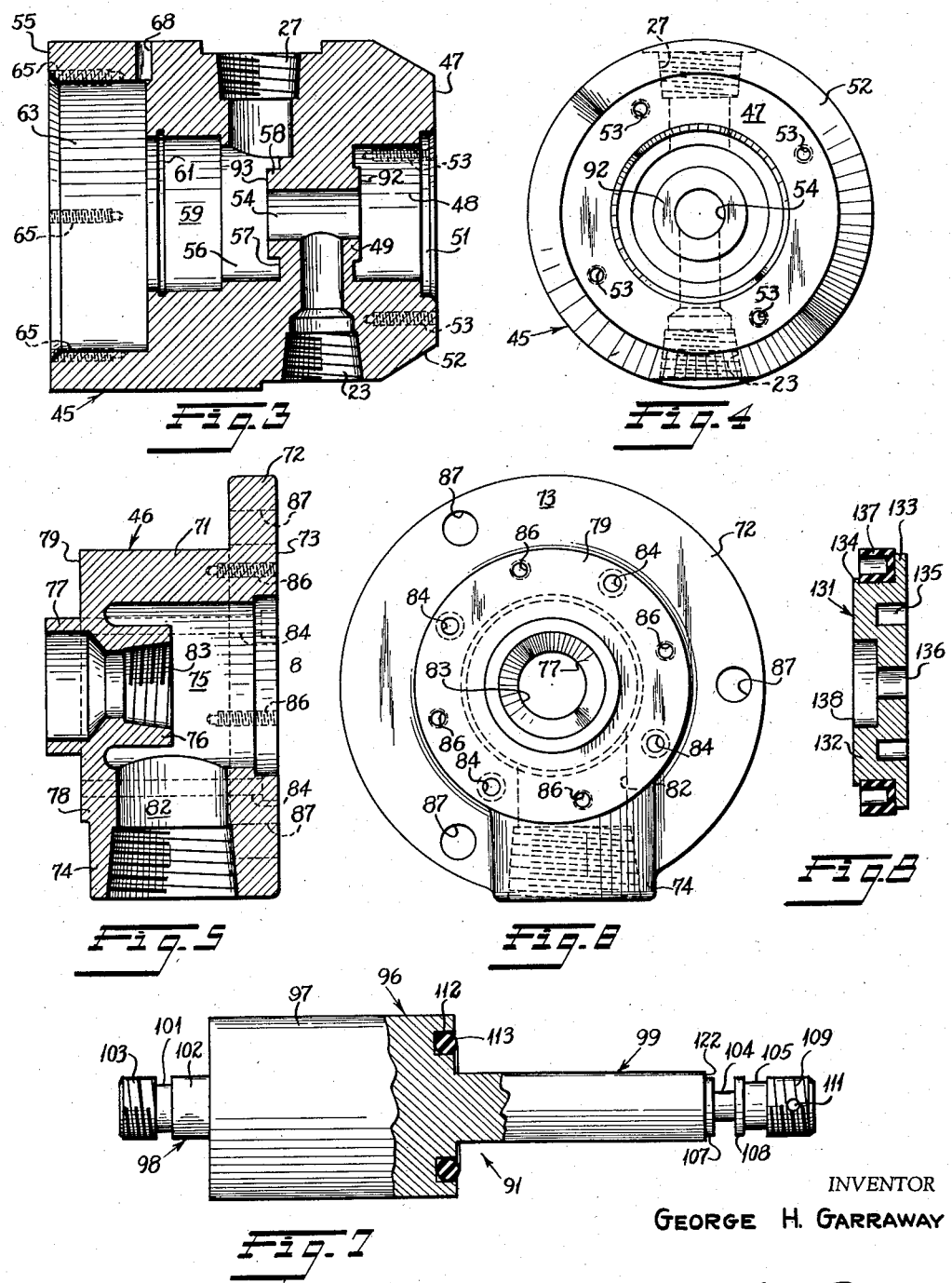
INVENTOR
GEORGE H. GARRAWAY
BY Strauch, Nolan & Diggins
ATTORNEYS

United States Patent Office 2,881,796
Patented Apr. 14, 1959

2,881,796

RECIRCULATING AND SUPPLY VALVE

George H. Garraway, Wyomissing, Pa.

Application February 17, 1954, Serial No. 410,873

3 Claims. (Cl. 137—561)

The present invention relates to improvements in valve structures and more particularly to an improved simplified recirculating and supply valve for handling a recirculating liquid and, if desired, a second fluid for mixing with the liquid.

While the present valve is adapted for many uses where it is desired to alternately supply a liquid for use from a supply system or to recirculate the liquid in a supply system to avoid an undesired physical change in the liquid that would occur if the flow of liquid in the system was stopped, the valve of this invention is of particular use in liquid fuel burner systems of the type referred to in United States Letters Patent 2,489,823 to E. J. Senninger, 2,000,733 to E. G. Avery and in the copending application of applicant and Richard P. Kirkup Serial No. 213,068 filed February 28, 1951 and entitled Fuel Flow Control.

In such liquid fuel burner supply systems, it is desirable, as the aforesaid copending application clearly points out, to preheat the liquid fuel to a desired temperature to assure proper atomization of the fuel at the fuel injector nozzle and prompt ignition of the fuel burner after a period of time when the burner is shut down and has cooled. While recirculating valves have been previously proposed as shown by the aforementioned Letters Patent and copending application, these prior recirculation valves have been unduly complicated, expensive to manufacture and assemble and are not sufficiently rugged to give the long uninterrupted service desired.

It, accordingly, is a primary object of this invention to provide a simple, rugged, inexpensive recirculation valve that can be depended upon to operate satisfactorily over long periods of time without interruption for servicing.

Still another important object of this invention is the provision of a recirculating valve that can be quickly and cheaply manufactured from standard stock material by simple machining and drilling operations.

Another object of the present invention resides in the provision of a recirculation valve made up of two sections one of which is a main body section that can be formed by simple machining and drilling operations and the other of which is an end section adapted for selective use where the valve is required to be used in a system for mixing two fluids such as liquid fuel and an atomizing fluid required in a fuel supply system for a liquid fuel burner.

A further object of the present invention resides in providing a recirculating valve body with a piston operated valve member having a unitary piston head and valve stem adapted for ready assembly with respect to the valve body to provide an assembled valve member with relatively immovable parts.

Still further objects will appear from the following specification and appended claims when read in conjunction with the accompanying drawings wherein:

Figure 1 is a diagrammatic view of a fuel circulating system of the type heretofore mentioned embodying a recirculating valve made in accordance with this invention.

Figure 2 is a vertical sectional view through the improved recirculating valve of Figure 1 illustrating the valve in its normally closed or recirculating position;

Figure 3 is a vertical sectional view through the drilled main valve body section of the valve of Figure 2;

Figure 4 is an end view of Figure 3 as viewed from the right of Figure 3;

Figure 5 is a vertical sectional view through the cast bottom body section of the valve of Figure 2;

Figure 6 is an end view of Figure 5 as viewed from the left end of Figure 5;

Figure 7 is a side elevational view of the piston operated valve element used in the valve of Figure 2; and Figure 8 is a detailed sectional view illustrating the piston and seal ring assembly employed in the piston operated valve element of Figure 7.

With continued reference to the drawings wherein like reference numerals are used throughout to indicate the same parts, the novel recirculation valve of the present invention is illustrated in a liquid fuel circulating system of an oil burner. It, however, will be appreciated that the valve may be employed in other liquid recirculating systems.

Referring now to the fuel circulating system of Figure 1, oil is supplied to this system from an inlet conduit 10 through an oil strainer 11 to an oil pump 12. Oil pump 12 forces oil through an oil preheater 13 and thence through conduit 14 to a constant pressure or constant flow valve 15, as may be desired, provided with an inlet connection 16, an outlet connection 17 for supplying the burner, and a return outlet connection 18 for recirculation. A return conduit 19 is connected between outlet 18 and conduit 10. An oil recirculating valve 21, which forms the subject of this invention and will be described in detail later, serves as a support for the oil injector assembly 22 and is provided with a fuel inlet fitting 23 (Figure 3) connected by conduit 24 to outlet 17 of constant pressure valve 15, a fuel conducting tube 25 leading directly to the nozzle 26 of the fuel injector nozzle assembly 22, and a fuel return outlet 27 (Figure 3) suitably connected through conduit 28 to the fuel return line 19.

The temperature of the oil supplied to the constant pressure valve 15 through inlet connection 16 is controlled at the oil preheater 13 which is a heat exchanger unit of generally conventional design. In the preheater here disclosed, steam is supplied from an inlet 29 through a valve 31 actuated by a regulator 32. Steam condensate is removed from the oil preheater 13 through pipe 33, steam trap 34, and pipe 35. Regulator 32 is connected through cable 36 to a thermal responsive element within coupling 37 in line 14 so that the supply oil temperature controls the degree of oil preheat. Due to the lag in this control, the supply oil temperature will fluctuate about an established operating norm.

The structural details of the constant pressure valve form no part of the present invention but may take any suitable form, for example, that shown in the aforementioned copending application of applicant and Richard P. Kirkup Serial No. 213,068. Such a valve accurately controls the quantity of oil flow through outlet connection 17 to the fuel injector assembly 22 either manually or by an suitable conventional automatic control mechanism acting on valve stem 38 to vary its position.

Control of recirculation of oil in the system is also controlled by valve 15 in response to pressure in inlet connection 16 through a pressure control bellows (not shown) which may be adjustably preloaded by screw 39 acting on a compression spring (not shown) housed within the control bellows. Lock nut 41 is provided to lock screw 39 in a preselected preloaded adjustment. All as more fully disclosed in the aforementioned copending application.

In operation, this constant pressure valve 15 is effective to vary the rate of flow through the return outlet connection 18 to maintain the oil inlet pressure to the valve 15 substantially constant regardless of the selected or set position of the valve stem 38. When oil circulation starts the oil pressure built up eventually overcomes the resistance of the preloaded pressure control bellows to raise the valve member and permit flow of oil through outlet return connection 18. A stable condition is soon reached for a given pump pressure corresponding to desired oil pressure in the inlet chamber of valve 15 which results in a certain throttling position of the valve.

Suppose the oil pressure in the valve inlet chamber increases and undesirably tends to increase the flow of oil through burner outlet 17. The pressure increase is transmitted to further collapse the preloaded pressure control bellows and further open the valve to increase the flow of oil thereby effectively reducing the oil pressure in the valve inlet chamber until the desired oil feed pressure is restored. The same but opposite action takes place when the oil pressure in the valve inlet becomes reduced.

The structure of oil circulating valve 21 is shown in Figures 2 through 8. Valve 21 has a main body section 45 (Figures 3 and 4) and a coupler section 46 (Figures 5 and 6). Body section 45 is preferably formed from suitable diameter brass rod stock of suitable length drilled, tapped and machined as hereinafter pointed out for ready and economical production. Coupler section 46, due to its more irregular configuration and internal formation, is preferably a brass casting.

Referring first to Figures 3 and 4, body section 45 of one preferred form of commercial valve is formed of 3 inch diameter stock 3½ inches in length having its end faces finished to a length of 3$\frac{13}{64}$ inches and turned to a 2⅞ inch diameter. This piece is drilled lengthwise along its longitudinal axis with a $\frac{7}{16}$ inch drill. The end face 47 is then counterbored to a depth of approximately $\frac{19}{32}$ inch using a 1⅛ inch boring bar to form an oil supply chamber 48. The bottom of chamber 48 is then spot faced to a depth of $\frac{1}{32}$ of an inch to form an annular boss 49, ¾ of an inch in diameter having a finished end face to serve as a valve seat. The area of end face 47 surrounding the chamber 48 is spot faced on a 1⅜ inch diameter to a depth of ⅛ of an inch to form a seal groove 51 and the peripheral outer corner of the seal groove 51 is chamfered as shown at 52 to a depth of $\frac{1}{64}$ inch with a 45° chamfer bit.

End face 47 along a 2 inch concentric diameter is provided with four 90° spaced tapped holes 53 formed by a number 36 inch drill to a depth of $\frac{9}{16}$ of an inch and a number 6 tap to a depth of ½ of an inch angularly offset 30° counterclockwise from the diametrical plane through the centerline of outlet 27 and a diametrical plane normal thereto for a purpose which will presently appear. The peripheral corners of end face 47 are taper cut at an angle of 60° from the plane of end face 47 as indicated at 52 to reduce the finished end face 47 to a diameter of 2¼ inches adapting body section 45 for close fitting connection to coupler section 46. Viewed from the end as in Figure 4 of the drawings, body section 45 has a 1⅛ inch annular burner oil supply chamber 48 leading to a centrally disposed $\frac{7}{16}$ inch diameter oil inlet passage 54 the purpose of which will be more fully hereinafter explained.

The opposite end face 55 is counterbored to a depth of 1$\frac{51}{64}$ inches by a 1⅛ inch boring bar to form a recirculation oil outlet chamber 56 at the opposite end of supply passage 54. Like chamber 48, the bottom of chamber 56 is spot faced as indicated at 57 but to a depth of ⅛ of an inch thereby forming an oppositely extending ¾ inch diameter boss 58 at the other end of passage 54 having a finished face to serve as a valve seat. End face 55 is further counterbored to a depth of 1$\frac{27}{64}$ inches with a 1¼ inch boring bar to form a packing chamber 59 adjacent oil return chamber 56. Chamber 59 inwardly from the end opposite chamber 56 is provided in well known manner with an annular groove 61 adapted to receive a snap ring 62 (Figure 2) the purpose of which will be hereinafter pointed out.

A further counterbore from end face 55 with a 2¼ inch boring bar to a depth of 1$\frac{3}{16}$ of an inch forms a piston chamber 63 the outer corner 64 of which is chamfered to a depth of $\frac{3}{32}$ of an inch with a 30° chamfer bit. The annular end wall 55 surrounding piston chamber 63 is provided with six tapped holes 65 disposed at equal distances along a 2⅝ inch diameter and formed by a No. 36 inch drill to a depth of $\frac{9}{16}$ of an inch and a No. 6 tap to a depth of ½ of an inch. These tapped holes 65 are provided for cap screws 66 employed to secure annular end closure plate 67 in place with respect to piston chamber 63 as shown in Figure 2. The end face 55 and abutting area of plate 67 are finished to form a suitable air seal or may, if desired, be separated by a suitable sealing gasket. Piston chamber 63 at its inner end is vented to the atmosphere by means of drilled hole 68 formed by a ⅛ inch drill entered into the side wall of body section 45 on a center 1$\frac{3}{16}$ of an inch inwardly from end face 55.

An inlet passage 23 leading to passage 54 and recirculating outlet passage 27 leading from oil return chamber 56 are formed in body section 45 by ⅜ inch drilled holes. Outlet 27 is drilled to a depth of ¾ inch so that its inner end clears boss 58 while inlet 23 is drilled through to passage 54. Both inlet 23 and outlet 27 are counterbored to a depth respectively of ½ of an inch and ⅞ of an inch with a $\frac{9}{16}$ inch counterboring drill, spot faced on a 1 inch diameter to a depth of $\frac{3}{32}$ inch and tapped throughout the counterbored area to fit ⅜ inch piping. While illustrated in Figures 2 and 3 at opposite sides of body section 45, inlet 23 and outlet 27 may be offset 90° from each other or at any other convenient relative angle.

Coupler section 46 as heretofore mentioned is preferably in the form of a brass casting comprising an annular body portion 71 of 2¼ inch outer diameter and 1⅝ inch depth, an annular mounting flange 72 at one end 73 of 3½ inch outer diameter, an annular boss 74 at one side of 1⅜ inch outer diameter and ⅝ inch depth, an annular concentric internal chamber 75 of 1⅜ inch diameter extending 1$\frac{7}{16}$ inch inwardly from the outer face of the end carrying flange 72 and having at its inner end an inwardly directed boss 76 the end face of which is ⅞ of an inch inward from the face of end 73 and a boss 77 of 1⅛ inch outer diameter concentric with boss 76 and extending in an opposite direction from end wall 78 opposite the open end of chamber 75. The exposed face 79 of wall 78 and the peripheral wall of boss 77 are preferably machined to respectively provide a close fit with end face 47 and the interior of chamber 48 of body section 45.

The open end of chamber 75 is spot faced to a depth of $\frac{3}{16}$ of an inch using a 1½ inch spot facing tool to form a groove 81 the purpose of which will hereafter appear. Bosses 74 and 76, 77 are provided with through passages in any suitable manner, preferably drilling, to respectively provide an air inlet to chamber 75 and oil supply passage from chamber 48 of body section 45 to the supply tube 25 leading to the nozzle 26. In the embodiment illustrated and described, boss 74 is drilled through to chamber 75 with a $\frac{15}{16}$ inch drill and then tapped to a depth of ⅝ of an inch to receive a ¾ inch pipe line to provide air inlet passage 82. Bosses 76 and 77 are simultaneously drilled through using a $\frac{19}{32}$ inch drill. Thereafter, boss 77 is counterbored to a depth of ½ inch using a $\frac{15}{16}$ inch counterbore drill and boss 76 is tapped to a depth of ⅜ of an inch using a ⅜ inch pipe tap to provide burner oil outlet passage 83 in open communication with chamber 48 of body section 45.

The body portion 71 along a two inch diameter concentric with chamber 75 and bosses 76 and 77 is provided with four 90° spaced through openings 84 formed by a No. 25 drill and counterbored from the end 73 to a depth of 5/32 of an inch with a 1/4 inch counterbore (Figures 2, 5 and 6) to receive cap screws 85 (Figure 2) for threadedly engaging tapped holes 53 of bottom section 45 and securing body section 45 to end section 46 in assembled relation. Openings 84 as clearly appears from Figure 6 are offset 30° clockwise from the diametrical plane containing the centerline of boss 74 and a diametrical plane normal thereto so that no opening 84 will intersect air inlet passage 82. This arrangement of openings 84 also assures proper mating relation of openings 84 with tapped holes 53 of body section 45 and assembled relation of body section 45 and coupler section 46 with the oil inlet 69 and air inlet 82 on the same side of the assembled oil circulating valve 21, a convenient arrangement assuring a neat piping layout of the character illustrated in Figure 1.

Face 73 of coupler section 46 at the four points intermediate openings 84 on the aforesaid two inch diameter is provided with tapped openings 86 formed by a No. 25 drill to a depth of 3/8 of an inch and a No. 10 tap to a depth of 1/4 of an inch. While one of the tapped openings 86 lies within the transverse dimension of passage 82 as viewed in Figure 6, the relatively shallow depth of openings 86 assures against intersection of passage 82.

The flange 72 at 120° intervals, arranged to clear boss 74 and at the same time permit mounting of circulating valve 21 on the burner with its inlet passages 23 and 82 facing downwardly, is provided with three holes 87 adapted to receive mounting bolts (not shown) for operatively mounting valve 21 in a burner wall with nozzle assembly 22 within the burner chamber.

The valve member 91 (Figure 2) of valve 21 is required to cooperate with the two oppositely facing seats 92 and 93 respectively provided by the end faces of bosses 49 and 58 of body section 45 to alternately supply oil to chamber 56 or chamber 48 and consequently to recirculation outlet 27 and burner supply outlet 83 at all times under control of a burner starter control 94 in the air line 95 leading to piston chamber 63. Simplification of valve member 91 to provide a rugged, long life valve member is an important phase of this invention.

To this end valve member 91 as illustrated comprises a head and stem body 96 having an enlarged head or guide portion 97 of 3/4 inch diameter and 1 1/32 inch length with oppositely extending reduced diameter concentric piston and valve mounting stems 98 and 99 respectively 1/4 inch in diameter and 3/8 inch in length and 9/32 inch in diameter and 1 1/2 inches in length. As clearly seen from Figure 7, the piston mounting stem 98 in the illustrated embodiment is annularly grooved at 101 to a depth of 3/64 of an inch and 1/16 of an inch in width to provide axially spaced mounting section 102 of 5/32 inch in length and terminal threaded section 103 of 11/64 inch in length.

The valve mounting stem 99 beginning at a point 1 1/16 inches from head portion 97 is reduced in diameter to 1/4 of an inch and provided with axially spaced annular grooves 104 and 105. Groove 104 is 3/64 of an inch deep and 3/32 of an inch wide, and is bounded at either end by narrow annular support surfaces 107 and 108. The annular flange forming surface 108 separates grooves 104 and 105 and the latter groove at its other end is bounded by terminal threaded section 109 having a transverse drilled opening 111 adapted to receive a locking pin in well known manner. The end face of head 97 in surrounding relation to stem 99 is annularly grooved at 112 to receive a sealing ring 113 (Figure 2) adapted to sealingly cooperate with valve seat 93 formed by the end face of boss 58.

Assembly of the valve member 91 is effected by entering its head and stem body 96 with ring 113 in place into body section 45 through piston chamber 63 stem end 99 foremost passing stem 99 successively through chambers 63, 59 and 56 and passage 54 and head 97 through chamber 63 and packing rings 117, mounted in chamber 59 as hereinafter described, until sealing ring 113 seats on seat 93. In this position, threaded terminal 109 will be disposed in chamber 48 near the open end in position to permit assembly of valve plate 118 (Figure 2) thereon.

Valve plate 118, as will be clear from Figure 2, has a central bore dimensioned to snugly receive support surfaces 107 and 108 and sealingly engage sealing ring 121 (Figure 2) mounted in groove 104 (Figure 7). Ring 121 is effective to obviate leakage of air or oil axially along stem 99. Plate 118 is clampingly engaged against shoulder 122 of stem 99 formed at the juncture of annular surface 107 with the end of the main body section of stem 99 by a clamp nut 123 threaded on terminal 109 and locked in place by pin 124 in drilled opening 111. The face of plate 118 opposite that engaged by nut 123 is annularly grooved to receive sealing ring 125 adapted to sealingly abut valve seat 92 in the normal recirculating position of valve member 91.

Packing rings 117 heretofore mentioned are of deformable material of generally V-shape in cross section disposed in chamber 59 in mating abutting relation between a metal retainer ring 126 of truncated cross-section and a metal retaining ring 127 the mating face of which is provided with a V-shaped annular groove to receive the end packing ring 117 remote from retaining ring 126. Rings 117, 126 and 127 are secured in packing chamber 59 under axial compression by snap ring 62 disposed in groove 61 while ring 127 is pressed toward ring 126 to deform rings 117 into sealing engagement with the wall of chamber 59 and head 97.

At this stage of assembly, valve member 91 is moved axially to engage ring 125 with seat 92 and dispose stem 98 adjacent the open end of chamber 63 in position to receive piston assembly 131 (Figure 2). As clearly appears from Figure 8, piston assembly 131 comprises an annulus 132 which, in the illustrated embodiment, is of a thickness of 7/16 of an inch and of a diameter of 1 3/4 inches. At one end annulus 132 is provided with an enlarged annular support flange 133 of 2 1/4 inch diameter and 1/16 inch thickness and at its other end is provided with an enlarged annular retaining lip 134 of 1 11/16 inches in diameter and 11/32 of an inch thickness. The face of annulus 132 at the end carrying flange 133 is annularly grooved at 135 and has a concentric bore 136 dimensioned to snugly receive mounting section 102 of stem 98. Flange 133 and lip 134 define between them an annular seat mounting a suitable piston ring 137. While piston ring 137 may take any desired form, it preferably comprises an annular resilient member of generally U-shaped cross-section mounted in the annular seat of annulus 132 with the free end of its inner annular wall engaging the underface of lip 134 and the outer annular wall partially overhanging flange 133 so as to slidingly and sealingly bear against the wall of piston chamber 63. The end face of annulus 132 opposite that containing groove 135 is preferably counterbored as indicated at 138 to freely receive a clamp nut 139 (Figure 2).

Before piston assembly 131 is mounted on stem 98, a coil spring 141 of predetermined strength to overcome the pressure of oil in passage 54 and move valve member 91 to firmly engage valve ring 125 on seat 92 when the burner controls operate to cut off the burner is positioned with one end bearing on snap ring 62 and its other end in groove 135 of assembly 131. Assembly 131 is mounted on stem 98 by fitting ring 137 in chamber 63 and pressing assembly 131 inwardly against the resistance of spring 141 until clamp nut 139 can be threaded on end 103. As soon as nut 139 is threadedly engaged it may be threaded home to firmly clamp annulus 132 against the face 142 of head 97 thereby completing the assembly of valve member 91. The pressure of spring 141 acting through annulus 132 is effective to frictionally lock nut 139 against accidental displacement from end 103 of stem 98 thereby eliminating the need of a locking pin for nut 139.

Body section 45 is then connected to coupler section 46 by means of cap screws 85 passing freely through openings 84 of section 46 and threadedly engaging tapped holes 53 of body section 45. To assure an air tight connection between body sections 45 and 46 a seal ring 144 (Figure 2) is disposed in groove 51 in position to sealingly engage the periphery of boss 77 and end face 79 of section 46. Completion of the assembly of valve 21 is effected by mounting end closure plate 67 on end face 55 of body section by means of cap screws 66 threadedly engaging tapped holes 65 of body section 45.

As clearly seen in Figure 2, closure plate 67 is provided with a tapped centrally located bore 145 adapted to provide a connection for compressed air inlet pipe 95 for supplying actuating fluid to chamber 63. Chamber 75 of coupler section 46 is also connected to a source of compressed air or steam by means of a pipe line 147 threaded into inlet connection 82 and is connected to nozzle assembly 22 by means of a supply tube 148 having one end fixed in groove 81 and disposed in surrounding relation to oil tube 25. Tube 148 may be secured in groove 81 by brazing, welding or any other suitable manner.

While valve 21 may be operated in various ways depending upon the system in which it is installed, operation in the illustrated system is as follows. Spring 141, during non-burning periods of the fluid burner, biases valve member 91 to a position in which valve element 118 sealingly engages seat 92 to disrupt flow of preheated oil from supply pipe 24 to oil tube 25 and provide recirculating flow of oil from supply conduit 24 through passage 54, chamber 56, outlet 27, conduits 28 and 19 to primary inlet conduit 10. At this time, flow of atomizing air or steam to nozzle 22 and compressed air to piston chamber 63 is cut off by thermostatically controlled valves 151 and 94 respectively disposed in pipe lines 147 and 95 (Figure 1) and operated in accordance with the temperature to be maintained by the burner. These valves, therefore, operate to selectively supply air or steam to nozzle 22 and air to piston chamber 63. It will, therefore, be appreciated that this recirculation position of valve member 91 establishes the normal condition of the valve 21 in the disclosed system, that the preheated oil will be continuously recirculated to maintain a ready heated oil supply to assure instant burner ignition when desired and that the circulating oil heats the valve 21 and its associated parts including tube 31 and nozzle 22 by conduction, up to about the temperature of the oil.

Assuming the control thermostats call for burner operation thermostatic valves 151 and 94 will be first opened to supply atomizing air or steam to nozzle 22 and air to piston chamber 63. Since the air or steam entering nozzle 22 has an unrestricted path to nozzle 22 as soon as valve 151 opens, a blast of air or steam to and through the nozzle 22 and burner results during the time that it takes valve 91 to operate. This blast of air or steam is effective to scavenge the burner before a combustible mixture of oil and air reaches nozzle 22 for injection into the burner. Since piston assembly 131 presents a substantial area to the incoming compressed air, a relatively rapid and positive movement of piston operated valve 91 to burner operating position with valve ring 113 seated on seat 93 takes place. Valve 21, accordingly, quickly responds to a call for burner operation and projects a portion, at least, of the oil in chamber 56 through passage 54 and tube 31 to nozzle 22. This oil, however, is at the desired preheated temperature and, therefore, there is no cold shug of oil supplied to tube 25 and nozzle 22.

It will be clear from the foregoing description that this invention provides a simple, rugged and effective recirculation valve which, when used in the disclosed system, assures heating up of the entire oil line right up to the point of entry of oil into the burner head and further assures that there is no cold oil in the system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A piston operated valve member for a recirculation valve comprising an enlarged head section annularly grooved at one end to receive a valve sealing ring; an elongated stem extending from said one end in concentric relation to said annular groove and terminating in a reduced diameter end portion having an externally threaded terminal portion, an adjacent shallow annular groove and an axially spaced deeper groove adapted to receive a sealing ring; a disk-like valve element having one end face annularly grooved to receive a valve sealing ring, a through bore to freely receive said end portion of said stem disposed on said end portion of said stem with said one end face abuttingly engaging a radial shoulder formed between the main part of said stem and said reduced end portion; a sealing ring in said deeper groove cooperating with the bore of said valve element to prevent leakage along said stem; a clamp nut threaded on said threaded terminal portion and abutting the other face of said valve element so as to clamp said valve element between said radial shoulder and said clamp nut; a short stem extending from said other end of said enlarged head section and having a threaded terminal portion; a disk-like piston element of substantially greater diameter than said enlarged head formed at one end with an annular groove and a radially outwardly extending annular support flange and at its other end with a centrally disposed concentric recess and a shallow radially outwardly turned securing lip and having a central through bore adapted to freely receive said short stem and disposed on said short stem with said one end against said other end of said enlarged head and said threaded terminal of said short stem extending into said recess; a clamp nut threaded on said threaded terminal of said short stem and abutting the bottom wall of said recess so as to clamp said disk-like piston element between said other end of said enlarged head section and said clamp nut; and a piston sealing ring of resilient material having a bore dimensioned to snugly receive the peripheral wall of said disk-like piston element delimited by said support flange and said turned lip, an outer wall of slightly greater diameter than said support flange and a thickness equal to the axial dimension of said delimited peripheral wall mounted on said delimited peripheral wall of said disk-like piston element and held against axial movement relative thereto by said support flange and said turned lip.

2. The piston operated valve member of claim 1 wherein said piston sealing ring is generally cup shaped in cross-section and provides an axially extending inner support wall gripped between said support flange and said turned lip, a radially outwardly spaced axially extending sealing wall adapted to slidingly sealingly engage the interior wall of a piston chamber in use, and a radially extending bottom wall abuttingly engaging said support flange and interconnecting said sealing wall and said support wall at adjacent ends and adapting said sealing wall for limited relative radial and axial movement with respect to said support wall during operation of piston valve member whereby operational stresses tending to disassociate said sealing ring from said disk-like piston element are minimized.

3. A burner mounted oil circulating valve of an atomizing fuel injector comprising a two piece body structure embodying a main body member having a through bore, a concentric counterbore formed at one end, and a passage intersecting said through bore and formed through a main body member side wall, the end wall of said counterbore having a valve seat thereon in concentric surrounding relation to said through bore, and an auxiliary body member having a first end face in abutment with said main body member one end, having a centrally apertured boss interfitting in piloting relation in said main body member counterbore and defining therewith a fuel outlet chamber from the adjacent end of said through passage, said auxiliary body member having a recess formed on its opposite end face, means on the recess end wall for attachment of the inlet end of a fuel conduit in spaced concentric relation to the peripheral wall of the said recess to receive fuel from said outlet chamber through the aperture of said boss, means on the peripheral wall of said recess for attachment of the inlet end of an atomizing fluid supply conduit in concentric surrounding relative to the fuel conduit, said auxiliary body member having an atomizing fluid inlet passage formed through a side wall thereof in intersecting relation with the peripheral wall of said recess intermediate the end wall thereof and said atomizing fluid conduit attachment means; a valve stem extending in spaced relation through said through bore into said counterbore, valve means fixed to said valve stem in said counterbore for coaction with said valve seat to control fuel flow from said passage into said counterbore; and means for selectively shifting the axial position of said valve stem in said through bore to control the position of said valve means relative to said valve seat.

References Cited in the file of this patent

UNITED STATES PATENTS

| | | |
|---|---|---|
| 1,312,735 | Kirby | Aug. 12, 1919 |
| 1,365,530 | Moore | Jan. 11, 1921 |
| 1,373,599 | Clark | Apr. 5, 1921 |
| 1,644,472 | Gray | Oct. 4, 1927 |
| 1,902,969 | Parks | Mar. 28, 1933 |
| 2,063,233 | Debauch | Dec. 8, 1936 |
| 2,414,629 | Bloss | Jan. 21, 1947 |
| 2,418,508 | Goepfrich | Apr. 8, 1947 |
| 2,574,299 | Sterrett | Nov. 6, 1951 |
| 2,587,405 | Stevens et al. | Feb. 26, 1952 |
| 2,589,794 | Frantz | Mar. 18, 1952 |
| 2,674,266 | Gardner | Apr. 6, 1954 |
| 2,714,394 | Moran | Aug. 2, 1955 |

FOREIGN PATENTS

| | | |
|---|---|---|
| 767,640 | Germany | Feb. 2, 1953 |